June 25, 1935.  V. CLAYWELL  2,006,013
AUTOMOBILE WHEEL ALIGNER
Filed July 24, 1934
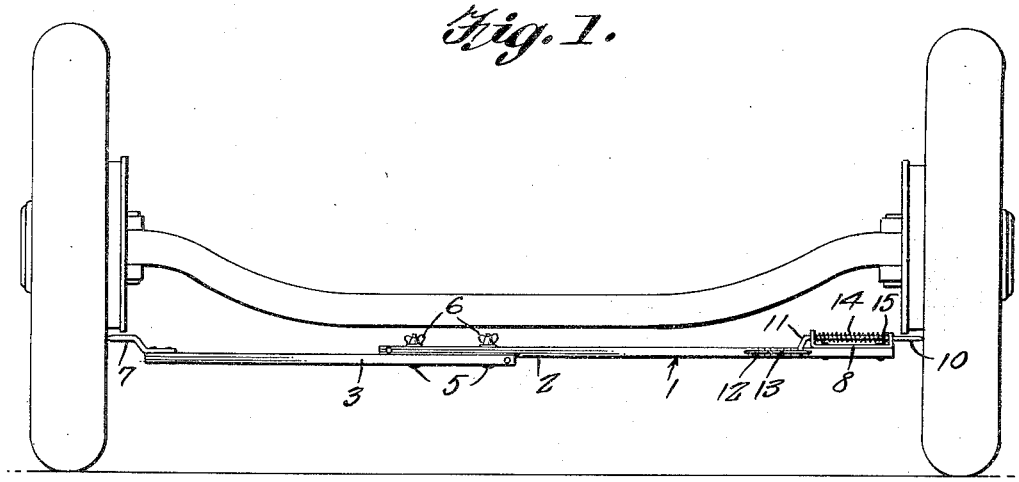
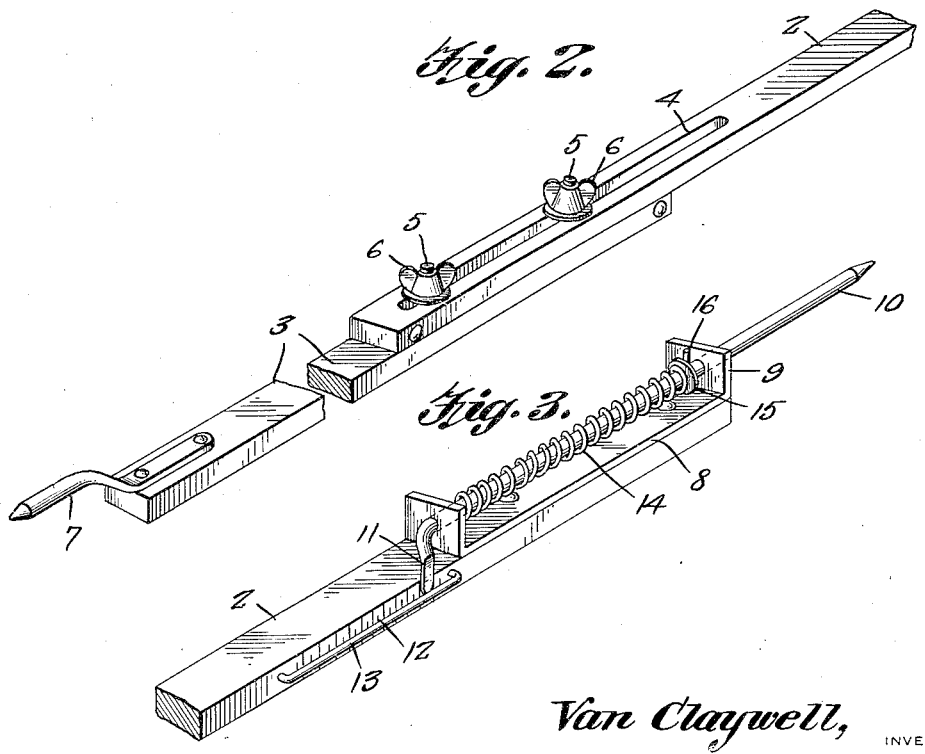
Van Claywell, INVENTOR
BY Victor J. Evans & Co.
ATTORNEY
WITNESS:

Patented June 25, 1935

2,006,013

UNITED STATES PATENT OFFICE 2,006,013

AUTOMOBILE WHEEL ALIGNER

Van Claywell, Siren, Wis.

Application July 24, 1934, Serial No. 736,740

2 Claims. (Cl. 33—203)

This invention relates to automobile wheel aligners and has for the primary object the provision of a device of the above stated character which will provide an easily operated device to permit accurate adjustments of the front wheels of an automobile to be made and which may be manufactured and sold at a low cost, so that any one engaged in automobile repairs may afford the device.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a front elevation illustrating an aligner adapted to the front wheels of an automobile and constructed in accordance with my invention.

Figure 2 is a fragmentary perspective view illustrating the adjustable bar and one of the wheel engaging elements of the device.

Figure 3 is a fragmentary perspective view illustrating the other wheel engaging element of the device.

Referring in detail to the drawing, the numeral 1 indicates a bar constructed of sections 2 and 3 having overlapped relation and one of said sections is provided with an elongated slot to receive bolts 5 carried by the other section. Wing nuts 6 are threaded to the bolts whereby the sections of the bar may be adjusted relative to each other and locked in their adjusted position. The section 3 has secured to its free end a pointed element 7 to engage with a wheel of an automobile, as shown in Figure 1. The section 2 of the bar has secured thereto a bracket 8 including angularly related apertured ends 9 to slidably receive a pointed wheel engaging element 10 in the form of a rod. The rod has one end angularly disposed to form a pointer 11 operating over a scale 12 applied to the section 2. A suitable guard 13 overlies the scale and the pointer 11 and is anchored to the section 2 of the bar. A coil spring 14 is mounted on the rod 10 and one end bears against one of the apertured ends of the bracket 8 while the opposite end bears against the washer 15 urging the latter in engagement with a pin 16 secured to the rod 10. The spring 14 normally acts to urge the rod 10 into the position shown in Figure 3, placing the pointer 11 at one end of the scale.

In operation, the element 7 is placed in engagement with one of the wheels of the automobile while the pointed end of the rod 10 is placed in engagement with the other wheel positioning the bar 1 a slight distance above the floor and in advance of the front axle of the automobile. During the application of the device to the wheels, the sections 2 and 3 are adjusted to place the pointer 11 to the extreme left of the scale. The car is then rolled forwardly on the floor with the gage remaining in engagement with the wheels or tires thereof until it is about the same distance from the floor in rear of the front axle. The movement of the pointer along the scale to the right indicates the toe-in of the front wheels. If the pointer moves to the left of the scale the front wheels need adjusting and by referring to the scale and pointer the operator may determine the amount of adjustment necessary to properly align the front wheels.

Having described the invention, I claim:

1. An automobile wheel aligner comprising a bar including sections adjustably connected whereby the length of the bar may be increased and decreased, a pointed element carried by one of the sections to engage with one of the wheels of an automobile, a bracket secured to the other section of the bar and having angularly related apertured ends, a pointed rod slidably mounted in the apertured ends of the bracket to engage with the other wheel of the automobile, a scale on the bar, said rod having a portion angularly disposed to operate over the scale as a pointer, and spring means for said rod.

2. An automobile wheel aligner comprising a bar including sections adjustably connected whereby the length of the bar may be increased and decreased, a pointed element carried by one of the sections to engage with one of the wheels of an automobile, a bracket secured to the other section of the bar and having angularly related apertured ends, a pointed rod slidably mounted in the apertured ends of the bracket to engage with the other wheel of the automobile, a scale on the bar, said rod having a portion angularly disposed to operate over the scale as a pointer, a coil spring mounted on the rod with one end bearing against one of the angularly disposed ends of the bracket, a washer on the rod engaging the other end of the spring, and a pin carried by the rod and engaging the washer.

VAN CLAYWELL.